United States Patent [19]

Leitz

[11] Patent Number: 4,510,695

[45] Date of Patent: Apr. 16, 1985

[54] METHOD OF CALIBRATION FOR THE MEASURING OF OBJECTS BY PAIRS OF THEODOLITES

[75] Inventor: Helmut Leitz, Konigsbronn, Fed. Rep. of Germany

[73] Assignee: Carl-Zeiss-Stiftung, Heidenheim/Brenz, Oberkochen, Fed. Rep. of Germany

[21] Appl. No.: 480,810

[22] Filed: Mar. 31, 1983

[30] Foreign Application Priority Data

Apr. 22, 1982 [DE] Fed. Rep. of Germany ....... 3215038

[51] Int. Cl.³ .............................................. G01C 15/02
[52] U.S. Cl. ........................................ 33/293; 33/281; 33/277
[58] Field of Search ............... 33/281, 1 T, 1 CC, 276, 33/277, 282, 285, 293

[56] References Cited

U.S. PATENT DOCUMENTS 2,904,890  9/1959  Vajda .................................... 33/293

Primary Examiner—Willis Little
Attorney, Agent, or Firm—Hopgood, Calimafde, Kalil, Blaustein & Judlowe

[57] ABSTRACT

The invention contemplates a method of calibration (FIG. 1) for determining the distance (base length $E_b$) between two angle-measuring instruments (theodolites 1, 2) used for triangulating measurement of coordinates of given points on larger objects.

For this purpose, a horizontal measurement bar (3) is fixedly set up between the measuring instruments (1, 2). The bar mounts at least three spaced target marks (4, 5, 6) in the form of balls which can be sighted from both sides, i.e., by both angle-measuring instruments (1, 2). The base length is calculated from the predetermined distance between the marks (4, 5, 6), and from difference in angles measured for each sighting.

Precise alignment of the bar (3) is not necessary, since inclination of the bar to the line connecting the theodolites can be calculated from the measured angles, for sightings made upon different pairs of marks (4/5 and 5/6, respectively).

10 Claims, 5 Drawing Figures

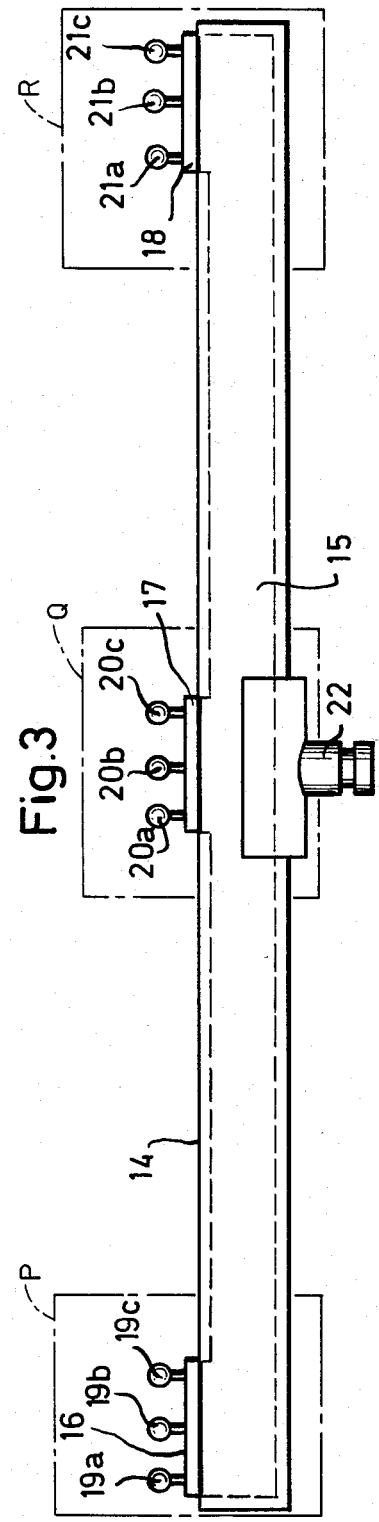
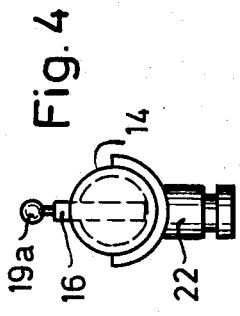
Fig. 4
Fig. 3
Fig. 5

METHOD OF CALIBRATION FOR THE MEASURING OF OBJECTS BY PAIRS OF THEODOLITES

BACKGROUND OF THE INVENTION

The present invention relates to a method for determining base length, for coordinate measurements by forward triangular intersection, using at least two angle-measuring devices (theodolites) at a fixed distance apart.

A method of measuring large industrial objects is described in "Bild der Wissenschaften", Volume 8, 1981, at page 14. In that method, two theodolites with electronic data output are connected to a common microcomputer which calculates in absolute value the coordinates x, y, z of sighted object points, from observed values for the horizontal angle $\gamma_i$ and the vertical angle $\epsilon_i$, as measured by the respective instruments. The basis for the calculations is the distance apart of the two measuring instruments, known as the base length, which should be ascertained as accurately as possible, since this base length determines the scale of the object coordinate system.

Direct measurement of the base length is frequently not possible, or it is possible only at excessively great expense. As a rule, the base length, therefore, is determined by sighting various check points on the object to be measured; then, from the known distances apart or from the coordinates of said points, the base length is determined by reversal of the computational procedure which is to be carried out in making the actual measurement.

It is clear that, with such a determination of base length, the error in measurement is greatly dependent on the geometry of the object and that it is of the same order of magnitude as for obtaining the actual measured values of the object coordinates.

However, a more accurate determination of the base length is desirable, approximately of the same order of magnitude as the precision of measurement of the angle-measuring instruments used.

To determine distances spaced apart in the range between about 2 meters and 20 meters, a so-called "subtense bar" is frequently employed in geodetics. This is a horizontal bar of 2 meters length; at each of its two ends a two-dimensional target mark is provided, at very precisely known spacing. When suitable material is selected for the bar, it is also stable with changes in temperature. Such bars are described, inter alia, in German Gebrauchsmuster patents Nos. 1,766,274 and 7,021,136.

If it is desired to use these bars for a determination of base length, they must be aligned very accurately and, after the sighting by one instrument, they must be reversed and adjusted in rotation, for sighting by the second instrument. In this connection, however, a zero-point error occurs since the axis of rotation generally does not precisely intersect the line connecting the two target marks.

BRIEF STATEMENT OF THE INVENTION

The object of the present invention is to provide a method of the aforementioned type which is simple and rapid to perform and which nevertheless yields measurement results which are as precise as possible.

The invention achieves this object using a calibrating device which carries at least three target marks which can be sighted from both sides and which is set up between the angle-measuring instruments and then surveyed.

By using a calibrating device having target marks which can be sighted from both sides, the device can be set up between the measuring instruments, i.e., at a shorter distance from each instrument than the distance to the object to be measured; the error in the base-length measurement, which is caused primarily by the precision in sighting and is proportional to the square of distance to the target object, is thus considerably reduced. No zero-point error occurs, since a calibrating device with target marks which can be sighted from both sides need not be adjusted in rotation.

The use of at least three target marks, the third of which is advisedly arranged approximately midway between the outer target marks, permits correction of the "swing", i.e., of the angle by which the line connecting the target marks may be inclined to the normal to the line connecting the two measuring instruments. Accordingly, precise alignment of the calibrating device is not necessary. The device, rather, is merely set up approximately at the midpoint between the angle measuring instruments in order to minimize the sighting error, and a naked-eye alignment perpendicular to the connecting line (base) of the measuring instruments is sufficient. The "swing" is then determined by comparison of measured values of the angles, in each case for different pairs of target marks, and "swing" is then taken into account by the computer, in the determination of base length.

DETAILED DESCRIPTION

Illustrative uses of a preferred embodiment of the invention will be described in detail, in conjunction with the accompanying drawings, in which:

FIG. 3 is an enlarged view in front elevation of the calibrating device schematically shown in FIG. 1;

FIG. 4 is an end view in elevation, for the calibrating device of FIG. 3; and

FIG. 5 is a diagram to show how one of the target marks of the calibrating device of FIG. 3 appears when centered in the viewing field of the telescope of an angle-measuring instrument.

Figure 1:
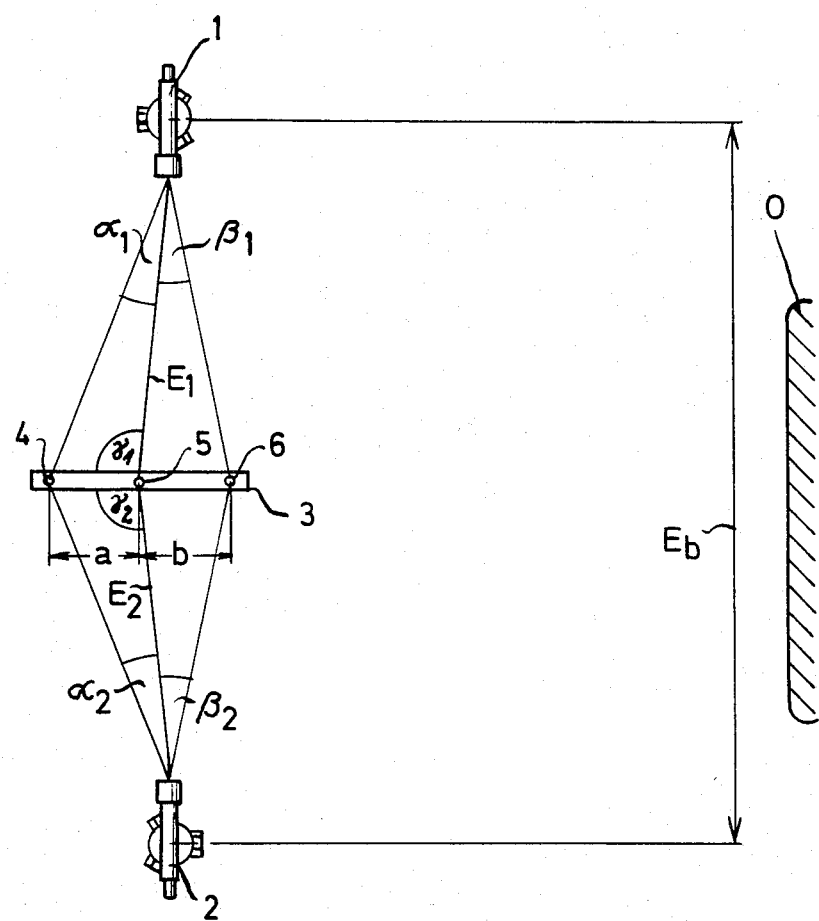
FIG. 1 is a sketch showing geometric relationships between measuring instruments and target marks, using a calibrating device of the invention.

In FIG. 1, reference numerals 1 and 2 identify a pair of theodolites which are set up a distance $E_b$ from each other to serve for the coordinate measurement of an object O. The base length $E_b$ and the distances of theodolites 1 and 2 from the object O are approximately the same.

To determine the base length, a calibrating device 3 in the form of a bar having three target marks 4, 5 and 6 which can be sighted by both theodolites and are preferably spherical bodies which, as will be described further below, are mounted on the bar.

The target mark 5 is approximately at the midpoint between the two outer target marks 4 and 6, and the distances between marks 4-5 and marks 5-6 are designated a and b, respectively.

To determine the base length $E_b$ as the vector sum of the distances $E_1$ and $E_2$ of the respective theodolites 1 and 2 from the central target mark 5, the angles $\alpha_1$, $\beta_1$ are first of all determined by sighting the three target marks 4, 5 and 6 from theodolite 1; and the angles $\alpha_2$ and $\beta_2$ are similarly determined by sighting from the theodolite 2. These angles are, as a rule, different from each other even if the distances apart a and b of the marks 4, 5 and 6 are exactly the same, since bar 3 may be inclined and laterally offset with respect to the line connecting the theodolites 1 and 2, with the consequence that mark 5 does not lie precisely on said connecting line. The angles of inclination $\gamma_1$ and $\gamma_2$ with respect to the lines connecting the central mark 5 with the two theodolites 1 and 2 can, however, be calculated from the difference between angles $\alpha$ and $\beta$, using the equation:

$$\tan\left(\frac{\pi}{4} - \gamma\right) = \frac{b \cot \beta - a \cot \alpha}{a + b}$$

After determining the values of $\gamma$, the two distances $E_1$ and $E_2$ can then also be calculated:

$$E_i = \frac{b \cos (\beta_i + \pi/4 - \gamma_i)}{\sin \beta_i} = \frac{a \cos (\alpha_i - \pi/4 + \gamma_i)}{\sin \alpha_i},$$

from which the base length $E_b$ is then obtained by vectorial addition, in accordance with known trigonometric formulas.

Figure 2:
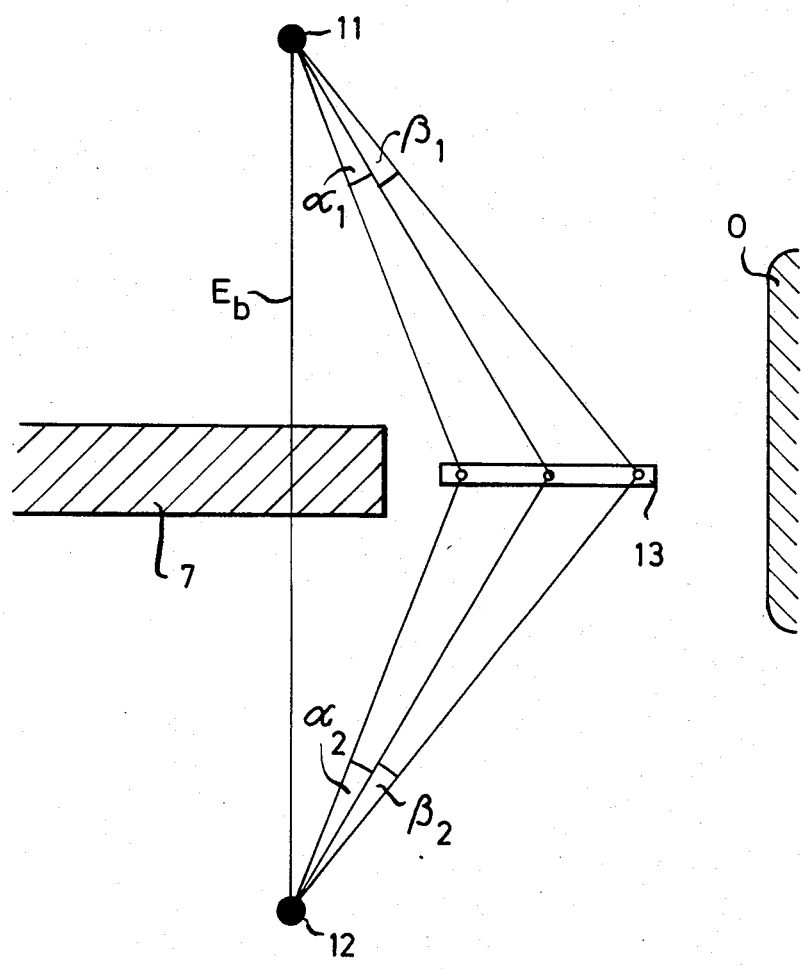
FIG. 2 is a sketch showing the geometric conditions in a situation slightly different from that of FIG. 1.

As shown in FIG. 2, it is not necessary for there to be visual contact between the theodolites used for the measurement, the distance apart of which is to be determined. Even if, for instance, a wall 7 is between the instruments 11 and 12, the bar 13 can be so shifted to a fixed position toward the object O as to assure sighting of the three target marks from both sides of the fixed bar.

FIGS. 3 and 4 illustrate in greater detail a preferred embodiment of the calibrating devices 3 and 13 of FIGS. 1 and 2, respectively. This embodiment comprises a tubular support 14 containing within it a rectangular bar 15 of temperature-stable Invar. The bar 15 includes three lands or webs 16, 17 and 18 which project locally through and out of the support tube 14. Three spaced balls 19a–c (20a–c and 21c–c) of aluminum oxide are mounted to the respective lands 16 (17, 18) and serve as target marks. The support tube 15 also has a swivel pin 22 by which the calibrating device can be mounted to a tripod or the like, with freedom for initial rotary adjustment, prior to fixing the same.

Since the measurement bar bears several balls 19a–c (20a–c, 21a–c) as target marks at the ends and at the middle of the measurement bar, all of which target marks are to be sighted one after the other, it is possible to derive the base length $E_b$ from several angle measurements. This increases the precision of measurement and furthermore, enables recognition of any erroneous sighting.

Since the balls are at precisly known spacing from each other, it is possible, as part of a check-up program, to compare (with the known spacings) the distances apart within each of the three-ball groups as calculated from the measured values; and, should they differ, the difference can be used to provide a corresponding error indication.

As FIG. 5 shows, the spherical target marks 19–21 can be readily sighted in the telescope cross hairs 23 of a theodolite. The target ball shape at all times affords the viewer a circular contour which can be centered very easily on the cross hairs 23 of the measuring instrument. Such a ball target therefore permits reliable sighting of one and the same point in space, namely the center of the ball, from all directions.

To facilitate the sighting process, it will be understood that one or more riders (not shown) may be removably mounted to the support tube; a preferably colored plate carried by such riders may provide a contrasting background for the target marks 19, 20, 21. Such plates are suggested by phantom outline at P, Q, R in FIG. 3 and are reversably changed by the operator, to place the background plate behind the target balls, depending on the angle-measuring instrument from which sighting is to be taken at any particular time.

What is claimed is:

1. The method of using at least three aligned optical targets at known fixed spacings on the alignment of the targets to determine the base length ($E_b$) between two angle-measuring instruments used for triangulation measurement of one or more points offset from a geometric line between the angle-measuring instruments, which method comprises placing said targets generally between the angle-measuring instruments and at a location where all three optical targets are individually sightable by each of said angle-measuring instruments, using said angle-measuring instruments to obtain their respective sighting angles to each of the three optical targets, computing for each of said instruments and from said sighting angles and from the fixed spacings of said targets the sighting distance to said targets and the sighting aspect of the alignment of said targets, and using the respective computed sighting distances and sighting aspects to determine the base length ($E_b$) as the sum of the respective sighting vectors to one of said targets.

2. The method of claim 1, in which said targets are placed approximately midway between the angle-measuring instruments and with their alignment approximately perpendicular to the geometric line between the angle-measuring instruments, in which deviation from the perpendicular is determined by comparison of sighting angles to different pairs of optical targets, and in which the determined deviation is used in determination of the base length.

3. The method of claim 1, in which the number of aligned optical targets is nine and all targets are positioned for individual sighting by each angle-measuring instrument, the optical targets being arrayed on their alignment in three spaced groups of three spaced individual targets, the spacings between target groups being greater than the target spacings within groups and all spacings being precisely known, sighting the individual targets in succession, and within the scope of a control program comparing calculated individual target spacings with the precisely known values.

4. Apparatus for determining the base length ($E_b$) between two angle-measuring instruments used for triangulation measurement of one or more points offset from the geometric alignment of the angle-measuring instruments, said apparatus comprising a calibrating device mounting at least three fixedly spaced and aligned optical targets in the form of balls on a single fixed axis of alignment, said targets being adapted to be sightable by each of the respective angle-measuring instruments when said calibrating device is fixedly positioned at a location generally intermediate the angle-measuring instruments, whereby said balls may be correctly sighted from each of the respective angle-measuring instruments, within a range of elevation differences between sighting and calibration locations, and regardless of whether the calibration device is above or below the elevation of either of the angle-measuring instruments.

5. Apparatus for determining the base length ($E_b$) between two angle-measuring instruments used in triangulation measurement of one or more points offset from the geometric alignment of the angle-measuring instruments, said apparatus comprising a calibrating device mounting at least three fixedly spaced and aligned optical targets which are adapted to be sightable by each of the respective angle-measuring instruments when fixedly positioned at a location generally intermediate the angle-measuring instruments, and each of said aligned optical targets comprising a cluster of plural target elements which are individually on the alignment of said three targets.

6. Apparatus according to claim 5, in which said calibrating device is an elongate bar of material having low thermal expansion.

7. Apparatus according to claim 5, in which each of said optical targets is a highly symmetrical three-dimensional body.

8. Apparatus according to claim 7, in which each of said bodies is a ball.

9. Apparatus for determining the base length ($E_b$) between two angle-measuring instruments used for triangulation measurement of one or more points offset from the geometric alignment of the angle-measuring instruments, said apparatus comprising a calibrating device mounting at least three fixedly spaced and aligned optical targets which are adapted to be sightable by each of the respective angle-measuring instruments when fixedly positioned at a location generally intermediate the angle-measuring instruments, and said calibrating device including means selectively and reversibly mounting one or more background plates behind a selected one or more of said targets, whereby measuring-instrument sighting may reversibly view a particular target in contrast with a background plate.

10. Apparatus for determining the base length ($E_b$) between two angle-measuring instruments used for triangulation measurement of one or more points offset from the geometric alignment of the angle-measuring instruments, said apparatus comprising a calibrating device mounting at least three fixedly spaced and aligned optical targets which are adapted to be sightable by each of the respective angle-measuring instruments when fixedly positioned at a location generally intermediate the angle-measuring instruments, and said calibrating device including a swivel pin on an upstanding central axis which intersects the alignment of said optical targets.

* * * * *